US006793061B2

(12) United States Patent
Struwe et al.

(10) Patent No.: US 6,793,061 B2
(45) Date of Patent: Sep. 21, 2004

(54) ESCALATOR OR MOVING STEP ASSEMBLY

(75) Inventors: Manfred Struwe, Seevetal (DE); Stefan Weber, Schwarzenbek (DE)

(73) Assignee: Thyssen Fahrtreppen GmbH (DE)

( * ) Notice: Subject to any disclaimer, the term of this patent is extended or adjusted under 35 U.S.C. 154(b) by 0 days.

(21) Appl. No.: 10/361,675

(22) Filed: Feb. 7, 2003

(65) Prior Publication Data

US 2003/0150692 A1 Aug. 14, 2003

(30) Foreign Application Priority Data

Feb. 8, 2002 (DE) .......................................... 102 06 449

(51) Int. Cl.[7] .............................................. B65G 15/00
(52) U.S. Cl. ..................................................... 198/323
(58) Field of Search ................................. 198/321, 323

(56) References Cited

U.S. PATENT DOCUMENTS 5,697,485 A * 12/1997 Abraham et al. ........... 198/322
5,785,165 A * 7/1998 Stahlhut et al. ............. 198/322
5,886,497 A * 3/1999 Zaharia ...................... 318/779
6,267,219 B1 * 7/2001 Spannhake et al. ......... 198/323

* cited by examiner

*Primary Examiner*—Richard Ridley
(74) *Attorney, Agent, or Firm*—R W Becker & Associates; R W Becker

(57) ABSTRACT

An escalator or moving step assembly includes a control unit, a plurality of input/output units each for providing data concerning a respective one of a location and a function of the escalator, and a standard bus system. The input/output units are connected to the standard bus system for communicating therewith. The escalator also includes a plurality of security position switches each having at least one opening contact and a plurality of security slaves each associated with a respective one of the security position switches and being communicated with the standard bus system. A security monitor communicated with the standard bus system and operating in cooperation with the security slaves initiates an intervention in the operation of the escalator in the event that an opening contact of a security slave is opened.

8 Claims, 2 Drawing Sheets

ESCALATOR OR MOVING STEP ASSEMBLY

BACKGROUND OF THE INVENTION

The present invention relates to an escalator or a moving step assembly.

Escalators and moving step assemblies require a control function and an overwatch or monitoring function in order to ensure the operation thereof as prescribed. In this connection, it is conventionally known to commonly connect a multiplicity of individual sensors and security position switches and display elements, which function as input/output units, to a bus, which, under the control of a so-called bus master, communicates in the respective desired manner with each of the so-connected units.

A bus system of this type has the advantage that individual connections between sensors, on the one hand, and, for example, display elements of the control unit on the other hand, can be dispensed with; a bus cable can be looped through the individual input/output units and can, in this manner, simultaneously provide service of the power supply as well as service of the signal communication between the control unit and the input/output units.

The individual input/output units of an escalator or a moving step assembly have differing criticalities, especially from the perspective of security technology. While, for example, it must be assured in all occurrences, due to the considerable risk of injury, that the drive motor of the escalator is immediately turned off if an escalator guest faces a risk of injury, or if the rate of rotation of the drive motor clearly exceeds the specified rate of rotation, there is no need to implement an operational stoppage, on the other hand, in the event of a partial outage of, for example, a handrail lighting, which has a decorative or aesthetic function.

The ability to automatically overmatch or monitor more and more components of the escalator or moving step assembly is a sought-after objective in the goal of reducing maintenance costs. Thus, for example, data concerning the mass of the extent of a chain hanging between two idler or bogie wheels can be captured as a measure of the wear of the chain and, from this data, the need for a chain exchange can be estimated.

Also, for example, the width of the gap between pallets or steps and the balustrade can be automatically monitored or overmatched. In this connection, the security overwatch points can be combined with aspects of the maintenance function; a security overwatch monitors a gap width for the reason that a maximum value of the gap cannot be exceeded if operational reliability is to be ensured, while, on the other hand, a variation of the gap width beyond a certain measure indicates a wear condition requiring maintenance such as, for example, a maintenance condition with respect to the idler or bogie wheels of the escalator steps.

The more complicated a bus system is, then, correspondingly, the greater is the susceptibility thereof to disturbances, for the reason alone of the correspondingly increased number of connections. However, in order to ensure the required reliability against outage of the operationally necessary units, it has become conventional practice to deploy a special security circuit which constantly overwatches or monitors the functional capability of the security relevant units. A security circuit of this type, however, increases the operational effort considerably so that while the security is, in fact, increased, the downtime of the escalator or the moving step assembly is correspondingly greater.

On the other hand, precisely because of such considerations of security monitoring, there has been a turning away from configuring the connectors of the security circuit as a bus system toward, instead, configuring the connectors of the security circuit to extend to and from the control unit in a star radiating-type configuration, which brings with it a correspondingly high wiring effort.

SUMMARY OF THE INVENTION

The present invention provides a solution to the challenge of providing an escalator or moving step assembly which makes possible an improved system availability while, nonetheless, comprising an especially reliable layout of the security function.

The solution provided by the present invention is set forth in the description and patent claims hereof.

In accordance with the present invention, it is particularly advantageous that no modification of the bus system is required but, nonetheless, the security category 4 of the security norm EN954-1 can be attained. In accordance with the present invention, security slaves are provided in this connection which are preferably provided with respective unique code lists. The security slaves are connected to security position switches which open in response to a failure of a unit. Via verification of the acknowledgement signals of the security slaves, the security monitor can establish a unique error identification without necessitating the deployment of a security-oriented master. Also, no deployment is required of so-called secure bus protocols, which are frequently incompatible with the conventional bus protocols and, as well, the effort needed to configure the double bus systems of this type is avoided.

In accordance with the security category 4, the security function continues even upon the occurrence of errors. The errors are recognized and the escalator or moving step assembly can be shut down in a suitable desired manner such as, for example, via interruption of the motor power supply and the actuation of the operating brakes effected by the motor power supply interruption.

In accordance with another embodiment of the invention, it is advantageous if the security circuit is looped through the input/output units in a shorthand manner. Although, to this extent, an electrical separation is created, with this approach, the same cable can be used. The connector of the security circuit can be disposed within the same protective covering as other connectors in the cable or, as desired, can be separately disposed in a separate protective covering within the cable. Via this approach, a security circuit having the required reliability can be configured, whereby solely two additional contacts are required between the holders of the units and the unit itself.

It is particularly advantageous that the units which are not significantly critical to the security function can, despite being without these contacts, also be inserted into corresponding units, whereby there is no need for a complete renovation of the unit but, and this counts as well in connection with a retro-fitting of a security circuit, solely the security related components need be exchanged.

In accordance with the present invention, it is advantageous that the security monitor is maintained free from control signals. The signal functions of the security monitor are performed solely by turning off or shutting down the escalator or the moving step assembly.

It is to be understood, that, as required, an address identification of the security relevant units is possible in a conventional manner via a serial protocol, in order to thereby localize the particular unit which has failed. In an advantageous embodiment, it is provided that solely a defect condition is permitted to be displayed via the security circuit while the actual evaluation which determines the address of the unit is conducted via the system bus. Via this approach, the effort required for the security circuit is considerably reduced while, at the same time, there is no need for a separate protocol.

In accordance with a further, especially advantageous perspective offered by the invention, the control unit, including the bus master and, as well, the alarm switch circuit, can be arranged in a respective input/output region in which the drive motor of the escalator or the moving step assembly need not likewise be located. It is to be understood that it is advantageous to dispose the relay or thyristor for control of the drive motor adjacent these just-noted separate located components and to connect solely the control inputs of these thyristors or relays with the control unit.

Further advantages, details, and features are set forth in the following description of an embodiment of the invention with reference to the figures of the drawings.

DETAILED DESCRIPTION OF THE PREFERRED EMBODIMENT

Figures 1, 2:
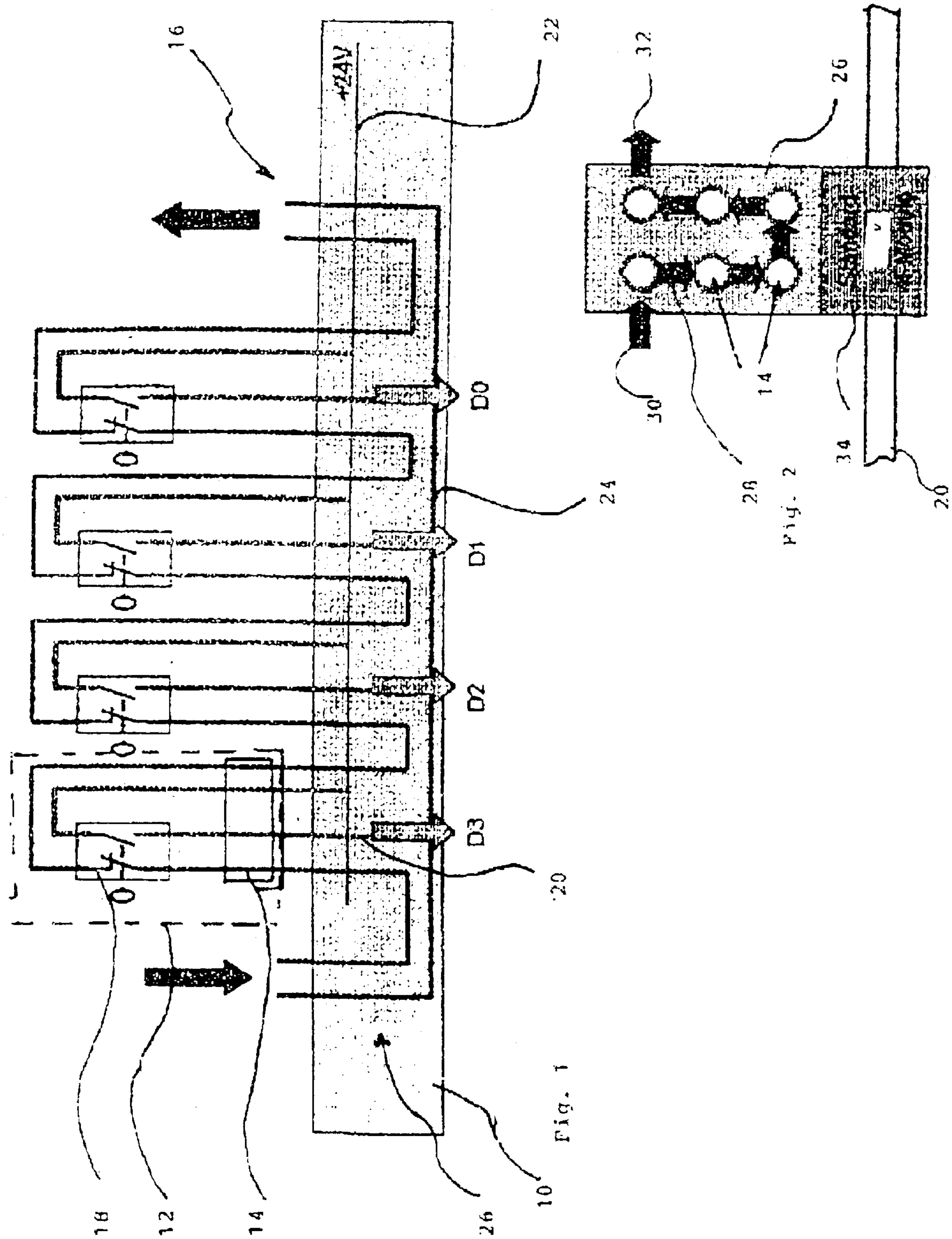
FIG. 1 is a schematic view of a detail of an escalator in accordance with one embodiment of the present invention showing a representation of the security circuit and a portion of the bus.
FIG. 2 is a schematic view of the switch unit for the embodiment shown in FIG. 1.

FIG. 1 shows a detail of one embodiment of the escalator of the present invention in schematic view. A plurality of input/output units of which, in FIG. 1, one input unit 12 having a security position switch is shown in broken lines, are connected to a bus system having a security slave 10. Each input unit 12 is connected via a multiple-prong plug connection with the bus system 10. The bus system permits an address identification of the individual input/output units in order to process the signals of the input/output units. The units 12 are cyclically queried in a conventional manner. A connection via a plug 14 for the unit 12 shown in FIG. 1 is schematically illustrated. It is to be understood that the other units have corresponding additional contacts.

In accordance with the invention, a security circuit 16 is provided which is looped in a serial manner through the entire complement of the plugs and the input/output units. The security circuit is connected in a functioning system to each input unit, as is indicated by the switch 18.

As can be seen in FIG. 1, the switch 18 connects in as well a bus connector 20 which is connected with a power supply connector 22. The power supply is automatically assured via the plugging-in of the input unit in this manner.

The manner in which the component 26 can be arranged relative to the plugs 14 can be seen in FIG. 2. Each plug 14 comprises a plurality of contacts among which are two security contacts. The arrow 28 indicates in schematic manner the looping of the security circuit 16 through the components 26.

It can be further seen in FIG. 2 that the security circuit extends through the component 26 from an input 30 to an output 32, whereby it is to be understood that the security switch can be provided in any suitable desired manner with an alarm-switching network disposed at the output.

The component shown in FIG. 2 can also be characterized as a security slave. This makes possible, in the region 34, the connection of four security position switches via which the plugs 14, which are connected to one another, are looped through into the security circuit.

While the plugs 14 are configured as quadruple-prong plugs, the component 26 is also provided with a region 34 which is operable to receive a bus system having double-prong plugs or quadruple-prong plugs. In this connection, standard input/output units are connected which do not require any security overmatching or monitoring in that they are not critical to the functioning of the escalator.

In accordance with the present invention, it is especially advantageous that a standard field bus system can be used. Such a system comprises, in the escalator central control device, a bus master which is connected with the bus connector 20 in the escalator support structure. The input/output units are characterized, in the view of the bus master, as the slaves or, respectively, the security slaves, in that these are integrated into the security circuit.

In accordance with the present invention, a special security circuit 16 is provided.

Each escalator requires, due to the multiplicity of the above-described security position switches, several such security slaves. Such security slaves are comprised of a housing with plugs, internal electronics, and an internal connector plate. They are connected at desired locations with the bus connector 20. Additionally, several security slaves are connected, via the assistance of the plugs 30 and 32, with one another, so that the security circuit 16 is thus configured to effect either the free flow or the interruption of the energy supply to the drive motor and/or the corresponding activation or non-activation of the brakes.

In accordance with the present invention, up to 4 security position switches can be connected at each security slave and the security position switches can be outfitted with double contacts. For example, a contact closer and a contact opener can be used or, alternatively, two contact openers can be used. A contact opener is required for the security circuit 16. The other contact opener provides a signal to the electronics in a security slave 10. In this manner, a diagnosis function is possible.

The bus connector 20 and the security circuit 16 are independent of one another and connected via separate connectors. Preferably, each connector is double insulated and just the connector for the security circuit is isolated with an increased electrical strength so that it can be disposed without further protection in the support structure of the escalator or the moving step assembly.

In accordance with the present invention, a standard bus system having standard input/output units for the non-security relevant functions and the security slaves can be connected simultaneously and a diagnosis by the standard bus is possible. It is especially advantageous in this connection that a connector guide is no longer required from each respective security position switch to the central control device.

Figure 3:
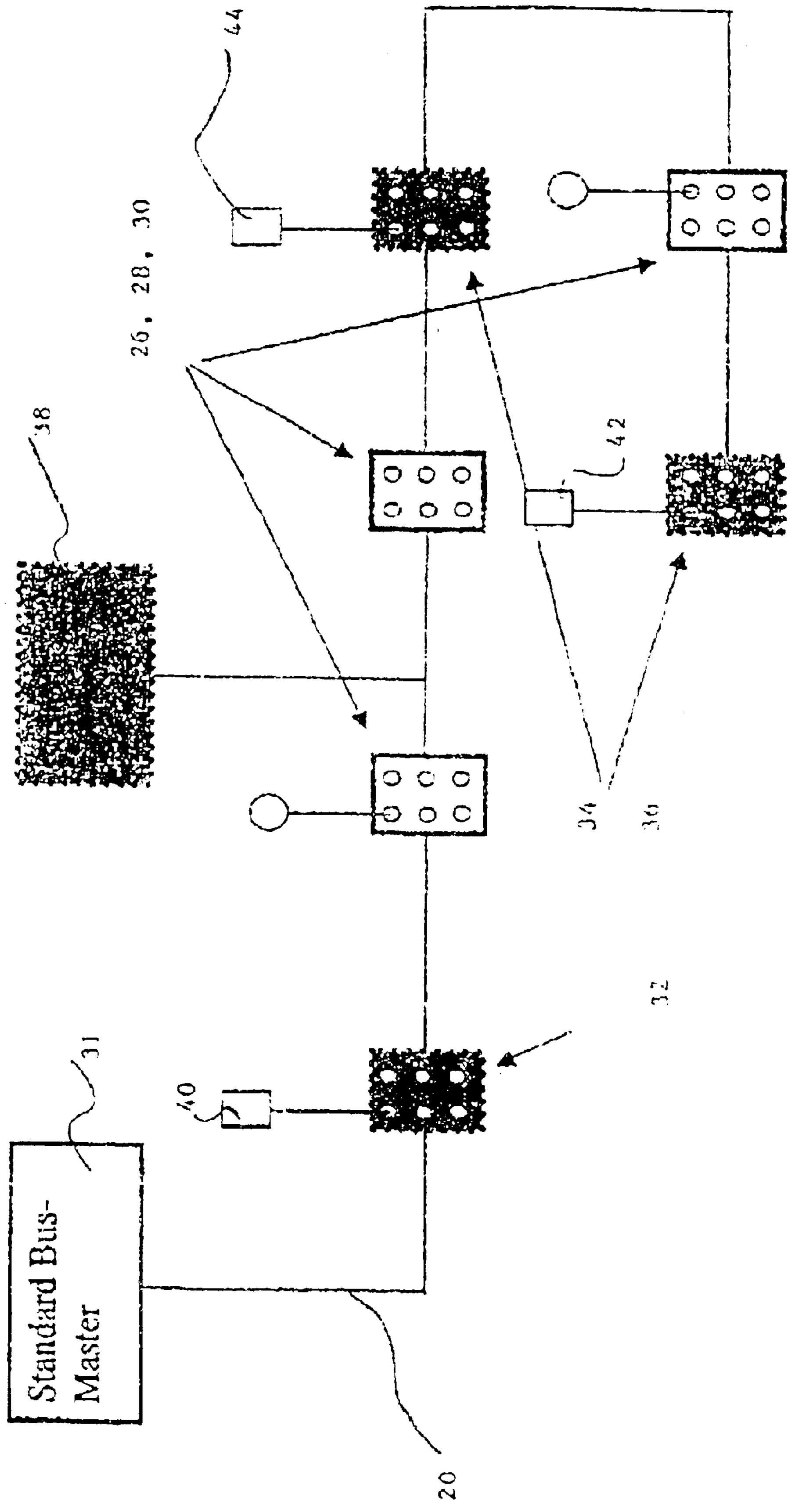
FIG. 3 is a basic circuit diagram of a decentralized control with conventional correspondent components and security-oriented correspondent components.

FIG. 3 is a fundamental schematic view of a decentralized control with standard correspondents and security-oriented correspondents. In the configuration visible in FIG. 3, a standard bus system with the bus connector 24 is provided on which are connected, as well, standard slaves 26, 28 and 30 as well as security slaves 32, 34 and 36. The standard slaves communicate in a conventional manner with a standard bus master 31.

In accordance with the present invention, a security monitor 38 is provided which overwatches or monitors the standard bus system 20 in a passive manner.

Each security-oriented slave is connected to a respective security position switch, each of which respectively includes an opening or security contact 40, 42, and 44.

Each security slave is provided with a unique code list which, for example, can be a four digit code list. Each security slave 32, 34, and 36 transmits its code list and the security monitor 38 receives and verifies the code lists in that the security monitor overwatches or monitors the signals provided to the bus 20.

In connection with the opening of a contact opener such as, for example, in connection with a security contact 40 of the security slave 32, the respective code of the security slave will no longer correspond with the proper authentic code and the security monitor 32 conducts a verification check to confirm that the code list is not the proper authentic code. The security monitor 38 comprises an evaluation control, secured against erroneous operation, which interrupts the power supply to the drive motor. Additionally, a self-verifying brake for the escalator or the moving step assembly is provided which is activated as well.

The security monitor further comprises a time-dependent overwatch or monitor function which emits an alarm signal in the event that the codes of the entire complement of slaves are not received within a predetermined time window. Via this approach, it is possible to attain the security category 4.

The specification incorporates by reference the disclosure of German priority document 102 06 449.0 filed Feb. 8, 2002.

The present invention is, of course, in no way restricted to the specific disclosure of the specification and drawings, but also encompasses any modifications within the scope of the appended claims.

What is claimed is:

1. An escalator or moving step assembly, comprising:

a control unit;

a plurality of input/output units each for providing data concerning a respective one of a location and a function of the escalator;

a standard bus system, the input/output units being connected to the standard bus system for communicating therewith and the standard bus system communicating with the control unit;

a plurality of security position switches each having at least one opening contact;

a plurality of security slaves each associated with a respective one of the security position switches and being communicated with the standard bus system; and a security monitor, the security monitor being communicated with the standard bus system and the security monitor and the security slaves operating in cooperation with one another to initiate an intervention in the operation of the escalator in the event that are opening contact of a security is opened, wherein the security monitor comprises a time-dependent overwatch or monitor function which emits an alarm signal in the event that the codes of the entire complement of slaves are not received within a predetermined time window.

2. An escalator according to claim 1, wherein each security slave has a code list uniquely associated therewith and the code list of each security slave is communicated to the standard bus system via the security position switches.

3. An escalator according to claim 2, wherein the security monitor receives the code lists from the security slaves for the purpose of identifying the security slaves and the security monitor compares code list data received from the security slaves with stored data concerning the code lists of the security slaves to thereby verify at least one of the presence and absence of a security related event requiring an intervention in the operation of the escalator.

4. An escalator according to claim 3, wherein the security monitor overwatches the standard bus system in a passive manner and the standard bus system and the security monitor each read code list data of the security slaves received by the standard bus system.

5. An escalator according to claim 1, wherein the security monitor includes an evaluation switch protected against erroneous operation and operable to intervene in the operation of the escalator, in response to an opening of an opening contact of one of the security position switches connected with a respective one of the security slaves, in at least one of an intervention to interrupt the power supply of a drive motor of the escalator and an intervention to activate a brake of the escalator.

6. An escalator according to claim 1, wherein the security monitor is operable to provide a security function in accordance with the specifications of category 4 of the security norm EN954-1.

7. An escalator according to claim 1, wherein each one of the security position switches includes a selected one of one opening contact and two opening contacts.

8. An escalator according to claim 2, wherein the code list of each security slave is communicated to the standard bus system via the security position switches and the opening contacts of the security position switches.

* * * * *